United States Patent [19]
Desurvire et al.

[11] Patent Number: 5,801,862
[45] Date of Patent: Sep. 1, 1998

[54] SYNCHRONOUS MODULATION METHOD AND APPARATUS FOR IN-LINE REGENERATION OF A WDM SOLITON SIGNAL, AND AN OPTICAL TELECOMMUNICATIONS SYSTEMS USING THE METHOD

[75] Inventors: Emmanuel Desurvire, Bruyeres le Chatel; José Chesnoy, Paris; Olivier Leclerc, Savigny sur Orge, all of France

[73] Assignee: Alcatel Submarine Networks, Clichy, France

[21] Appl. No.: 787,215

[22] Filed: Jan. 22, 1997

[30] Foreign Application Priority Data

Jan. 23, 1996 [FR] France .................. 96 00732

[51] Int. Cl.$^6$ .................. H04J 14/02; H04B 10/00
[52] U.S. Cl. .................. 359/124; 359/158; 359/161; 359/173; 359/176
[58] Field of Search .................. 359/124, 127, 359/158, 161, 173, 176, 179, 188, 195

[56] References Cited

U.S. PATENT DOCUMENTS 5,369,520  11/1994  Avramopoulos et al. ............ 359/176
5,642,215   6/1997  Suzuki et al. ............ 359/161

OTHER PUBLICATIONS

M. Nakazawa, Experimental Demonstration of Soliton Data Transmission Over Unlimited Distances with Soliton Control in Time and Frequency Domains, *Electronics Letters*, vol. 29, No. 9, 29 Apr. '93, pp. 729–730.

M. Jinno et al., "All–Optical Regenerator Based on NonLinear Fibre Sagnac Interferometer", *Electronics Letters*, vol. 28, No. 14, 2 Jul. 1992, pp. 1350–1352.

M. Nakazawa et al, 806GBit/s Soliton Data Transmission Over 500KM with Unequal Amplitude Solitons for Timing Clock Extraction.

Iwatsuki et al., "40 Git/s Optical Soliton Transmission Over 65 km", Electronics Letters, vol. 28, No. 19, Sep. 10, 1992. pp. 1821–1822.

*Primary Examiner*—Kinfe-Michael Negash
*Attorney, Agent, or Firm*—Sughrue, Mion, Zinn, Macpeak & Seas, PLLC

[57] ABSTRACT

The object of the invention enables wavelength division multiplexed solitons conveyed by an optical fiber to be regenerated synchronously. The method uses clock recovery from the WDM signal, and synchronous modulation of the solitons at the clock rate recovered in this way. The locations for the optical modulators are selected to be at a distance between the transmitter and the first modulator or between successive modulators along the optical link such that the signals at different wavelengths are synchronous. The apparatus of the invention regenerates solitons in-line by synchronously modulating said solitons using an optical modulator, clock recovery, and multichannel filtering at the output from the modulator. In a particular embodiment, the telecommunications system of the invention also includes fiber lengths having different dispersion relationships depending on their position within the link, so as to achieve "dispersion management" within the link. The invention is applicable to optical telecommunications over great distances by means of solitons.

17 Claims, 4 Drawing Sheets

SYNCHRONOUS MODULATION METHOD AND APPARATUS FOR IN-LINE REGENERATION OF A WDM SOLITON SIGNAL, AND AN OPTICAL TELECOMMUNICATIONS SYSTEMS USING THE METHOD

The invention relates to the field of optical fiber telecommunications, and more particularly the field of telecommunications over long distances. For very long distance optical fiber links, it is known to use a "soliton" type signal having special spectral properties that enable the signal to propagate over a dispersive fiber without significant chromatic dispersion, i.e. use is made of the way in which refractive index varies with signal intensity to counterbalance chromatic dispersion, or vice versa. The spectral form of the signal is preserved in spite of the effects of propagation distance, which are thus mainly constituted by line losses. Such line losses can be compensated by in-line optical amplification, e.g. using an erbium doped fiber amplifier (EDFA).

BACKGROUND OF THE INVENTION

For soliton transmission with in-line amplification (using EDFAs), the problems that remain to be solved are known:

1) Gordon-Haus jitter which gives rise to uncertainty concerning the arrival times of signal bits; and
2) the accumulation of noise coming from the amplification of spontaneous emission in the optical amplifiers.

Various solutions have been proposed and described in the following documents which are expressly incorporated in the present application as descriptions of the prior art:

D1=EP-A1 576 208 by J. P. Gordon and L. F. Mollenauer, "Soliton system having sliding-frequency guiding filters". According to the teaching of that document, inserting a plurality of filters with a center of frequency that varies along a soliton type signal transmission link makes lumped amplification of solitons possible without exponentially amplifying spontaneous emission noise. There is no soliton regeneration in that system. According to document D1, the advantage of such a system is its compatibility with wavelength division multiplex (WDM) transmission. That document also cites the teaching of document D2 below, but observes that the technique of D2 would be incompatible with WDM (see page 2, lines 21–24).

Synchronous modulation for in-line soliton regeneration is taught by document D2=Nakazawa et al. (1991), "10 Gbit/s soliton data transmission over one million kilometers", Elect. Lett. 27 (14), pp. 1270–1272, Jul. 4, 1991.

Document D2 teaches the use of an $LiNO_3$ optical modulator for performing synchronous modulation of solitons, with a clock signal generated from the same clock as is used for the soliton source. A very long distance link was simulated on a 500 km fiber loop with an erbium doped fiber optical amplifier every 50 km and with regeneration on each circuit round the loop. Because of the dispersion of the soliton transmission fiber, which varies over the range −0.7 ps/km/nm to −2.2 ps/km/nm with a mean of −1.5 ps/km/nm, the travel time to perform one circuit round the loop depends on the wavelength of the soliton. That is why such a system is not appropriate for WDM transmission, as emphasized by D1.

D3=L. F. Mollenauer et al. (1991), "Wavelength division multiplexing with solitons in ultra-long distance transmission using lumped amplifiers", Journal of Lightwave Tech., 9 (3), pp. 362–367, March 1991. That document proposes a WDM soliton transmission system with lumped optical amplification, for transoceanic distances (9000 km). The teaching of that document relates mainly to collisions between solitons of different wavelengths. The document gives typical values for various parameters in such a link.

For example, the value of the chromatic dispersion distribution of commercially-available shifted-dispersion fibers is about ±0.5 ps/nm/km. In addition, on page 363, righthand column, last paragraph, D3 speaks about managing the dispersion values of the lengths of fiber making up the link.

On page 365, righthand column, first paragraph, a practical example of a link is given, with numerical values for the parameters. The distance $L_{pert}$ corresponding to a mean distance between soliton perturbations due to collisions or to variations in dispersion between successive lengths, is 40 km, with a mean dispersion D=1 ps/km/nm; there are four 4 Gbit/s WDM channels at a maximum spacing of 1.2 nm; the solitons have a time width $\tau$=50 ps, and minimum separation of 5 $\tau$; and the soliton period is of the order of $z_0$=930 km. The jitter generated by interactions between adjacent channels is of the order of ±7.5 ps; for a four-channel system, the most unfavorable case could generate jitter of ±22.5 ps.

Nevertheless, in all of the cases considered by document D3, synchronizing the arrival of solitons at the end of the link is neither provided nor required.

Other documents are useful for obtaining a better understanding of the present invention, and are mentioned briefly with a summary of their contribution to this end. Such other documents are also expressly incorporated in the present application as descriptions of the prior art:

D4=M. Nakazawa et al. (1995), "Optical soliton communication in a positively and negatively dispersion-allocated optical fiber transmission line", Electr. Lett., 31 (3), pp. 216–217, Feb. 2, 1995. That document relates more particularly to managing dispersion in an optical link for soliton transmission and comprising a plurality of fiber lengths having different dispersions. The teaching of that document concerns the fact that only the mean dispersion, integrated over the entire length of the link needs to be negative in order to conserve the properties of solitons: thus, regions of positive dispersion can be accommodated providing the total integrated balance remains negative.

D5=S. Kumar et al. (1995), "Dispersion managements on soliton transmission in fibers with lumped amplifiers", Proc. Int'l. Symposium on Physics and Applications of Optical Solitons in Fibers, Kyoto, Japan, pp. 1–12, Nov. 14–17, 1995. The last chapter of that paper discusses the various aspects of managing dispersion in non-regenerated WDM systems.

Documents D3 and D5 develop the relationships concerning the distances between lumped optical amplifiers and the mean link length between collisions between solitons in different channels, and D5 teaches a method of selecting fibers having different negative dispersion values so as to retain non-linear effects of dispersion as a function of light signal amplitude along the link that are quasi steady.

The systems proposed by those prior art documents are unsatisfactory since none of them makes it possible to use a plurality of WDM channels with a system for regenerating solitons synchronously. All of the documents cited contribute something which could be useful in such a system, but most of them observe that there is no synchronization between the channels, and thus the question of synchronous regeneration is beside the point under such circumstances. That is why it does not appear possible, from the well-established prejudices of the person skilled in the art, to envisage very high data rate WDM optical links over very long distances by means of wavelength multiplexed solitons while also using regeneration to eliminate Gordon-Haus jitter and to maintain optimal spectral shape for the solitons.

OBJECTS AND SUMMARY OF THE INVENTION

An object of the invention is to mitigate the problems of the prior art.

To this end, the invention provides a method of in-line regeneration of optical signals propagating over an optical fiber between a transmitter and a receiver, said signals being in the form of a stream of bits represented by solitons characterized in particular by a propagation wavelength and by a bit rate, the method comprising the following steps:

said optical signal to be regenerated is amplified to compensate for possible losses;

a portion of the optical signal to be regenerated is taken off via an optical coupler coupled to said fiber;

the clock signal of said bit stream is recovered from said taken-off portion;

said clock signal is applied via appropriate phase shifting to an optical modulator in order to provide synchronous modulation of said optical signal to be regenerated; and the solitons of said optical signal to be regenerated are subjected to spectral filtering after said synchronous modulation;

wherein said solitons are characterized by a plurality m of propagation wavelengths lying in a spectrum band having ends $\lambda_1$ and $\lambda_4$ which are respectively the shortest and the longest wavelengths of said plurality; and said clock signal is recovered from a wavelength $\lambda_k$ lying between the wavelengths $\lambda_1$ and $\lambda_n$, such that $\tau_g(\lambda_k)Z_R = kT$; and wherein said regeneration is performed at a distance $Z_R$ between said transmitter and said optical modulator, or between two successive modulators, where said distance $Z_R$ is selected so that its product when multiplied by the arrival time difference $\delta\tau_g = \tau_g(\lambda_n) - \tau_g(\lambda_1)$ satisfies the following condition:

$$[kT - T/4] < \delta\tau_g Z_R < [kT + T/4]$$

where k is integer and T is the bit time (for $Z_R$ in km and $\delta\tau_g$ in ps·km$^{-1}$).

In an advantageous variant, said distance $Z_R$ is selected so that its product when multiplied by the group time difference $\delta\tau_g = \tau_g(\lambda_n) - \tau_g(\lambda_1)$ satisfies the following condition:

$$[kT - T/N] < \delta\tau_g Z_R < [kT + T/N]$$

where N>4.

In a variant, the method relates to WDM soliton optical signals having a plurality m of WDM channels selected from n channels $(c_1, \ldots, c_n)$ having respective wavelengths $\lambda_1$, $\lambda_2, \ldots, \lambda_n$, with $\lambda_j - \lambda_{j-1} = \Delta\lambda$, $\forall j > 0$, for integer j, and $$\lambda_1 - \lambda_0 = \frac{\Delta\lambda}{2} = \left(\frac{T_{bit}}{4Z_R D_0}\right)^{1/2}$$

where $\lambda_0$ is the zero-dispersion wavelength.

According to an advantageous characteristic, said optical fiber comprises a plurality of fiber lengths, each length being characterized in part by a length and by a value for chromatic dispersion, said method further comprising managing the dispersion of said lengths of fiber.

In a variant, the invention also relates to an optical transmission system for transmitting optical signals in the form of bit streams represented by solitons characterized in particular by a propagation wavelength and a bit rate, said system including at least a transmitter and a receiver plus an optical fiber interconnecting them; said system further comprising at least one optical regenerator apparatus including a clock recovery circuit and an optical modulator together with a spectral filter;

wherein:

said transmitter transmits solitons at a plurality of wavelengths lying in a spectrum band having ends $\lambda_1$ and $\lambda_n$, respectively being the shortest and the longest wavelengths of said plurality;

said different wavelengths being associated with respective different group propagation times $\tau_g(\lambda_1)$, $\tau_g(\lambda_n)$, said group propagation times being characterized by a group propagation time difference $\delta\tau_g = \tau_g(\lambda_n) - \tau_g(\lambda_1)$;

and wherein said optical regenerator apparatus is disposed at a distance $Z_R$ between said transmitter and said optical modulator, or between two successive modulators, said distance $Z_R$ being selected such that its product when multiplied by the group propagation time difference $\delta\tau_g = \tau_g(\lambda_n) - \tau_g(\lambda_1)$ satisfies the condition:

$$[kT - T/4] < \delta\tau_g Z_R < [kT + T/4]$$

where k is integer and T is the bit time (for $Z_R$ in km and $\delta\tau_g$ in ps·km$^{-1}$).

According to a characteristic, said distance $Z_R$ is selected so that its product when multiplied by the group propagation time difference $\delta\tau_g = \tau_g(\lambda_n) - \tau_g(\lambda_1)$ satisfies the condition:

$$[kT - T/N] < \delta\tau_g Z_R < [kT + T/N]$$

where N>4.

In another advantageous variant, said WDM system uses a plurality m of WDM channels selected from n channels $(c_1, \ldots, c_n)$ having respective wavelengths $\lambda_1$, $\lambda_2, \ldots, \lambda_n$, where $\lambda_j - \lambda_{j-1} = \Delta\lambda$, $\forall j > 0$, for integer j, and $$\lambda_1 - \lambda_0 = \frac{\Delta\lambda}{2} = \left(\frac{T_{bit}}{4Z_R D_0}\right)^{1/2}$$

where $\lambda_0$ is the zero-dispersion wavelength.

According to a characteristic, said system comprises a plurality of fiber lengths, each length being characterized in part by a length and by a value for chromatic dispersion, and the system of the invention further includes management of the dispersion of said fiber lengths.

In another embodiment, the invention provides apparatus for regenerating solitons, comprising a clock recovery circuit RH synchronized to the bit rate of a soliton signal on a transmission channel via an optical coupler; means for matching phase Φ, e.g. an optical delay line; and an intensity and/or phase modulator driven by the clock signal RF, said apparatus further including an optical channel guiding filter serving to put the soliton pulses at a plurality of wavelengths into the same time position.

BRIEF DESCRIPTION OF THE DRAWINGS

The invention will be better understood together with its various characteristics and advantages, in the light of the following detailed description and the accompanying drawings, in which.

The drawings are given by way of non-limiting example to illustrate the principles of the invention and a few variants thereof. In all the figures, the same references refer to the same elements, and the figures are not always to scale for reasons of clarity.

MORE DETAILED DESCRIPTION

Figure 1:
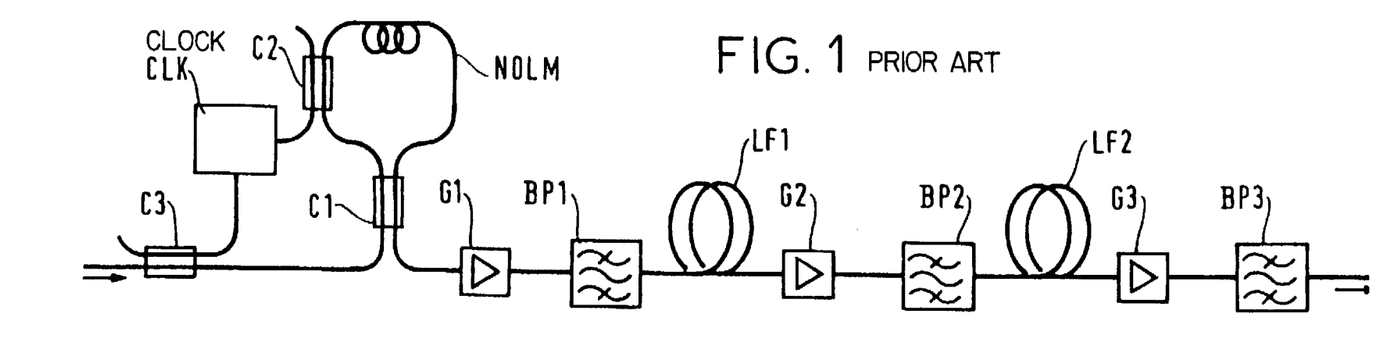
FIG. 1 is a diagram of an example of an optical fiber optical transmission system implementing architecture known in the prior art and suitable for use in apparatus of the invention.

FIG. 1 is a diagram showing an example of an optical fiber optical transmission system using architecture known in the prior art, and suitable for use in apparatus of the invention. The system shown in this figure comprises regenerator apparatus (C3, CLK, C2, C1, NOLM) together with a plurality of in-line optical amplifiers (G1, G2, G3, ...) and a plurality of guiding filters (BP1, BP2, BP3, ...). The guiding filters compress the spectrum width of the solitons, but in so doing they remove energy from the solitons. That is why the gain of the in-line amplifiers needs to be greater than the line losses to which the solitons are subject over the optical fibers (LF1, LF2, ...) between the amplifiers (G1, G2, G3, ...). By reducing the spectrum width of the solitons, the guiding filters also reduce time jitter, as explained in document D1.

In the soliton regenerator and in the system of FIG. 1, known from D1, for example, the guiding filters are bandpass filters having a spectrum width that is slightly narrower than that of the solitons. In the soliton regenerator and in the system of the invention, the guiding filters are channel filters, i.e. bandpass filters which pass a plurality of narrow bands having different center frequencies and corresponding to the wavelengths of different channels in a wavelength division multiplexed system.

Figure 2:
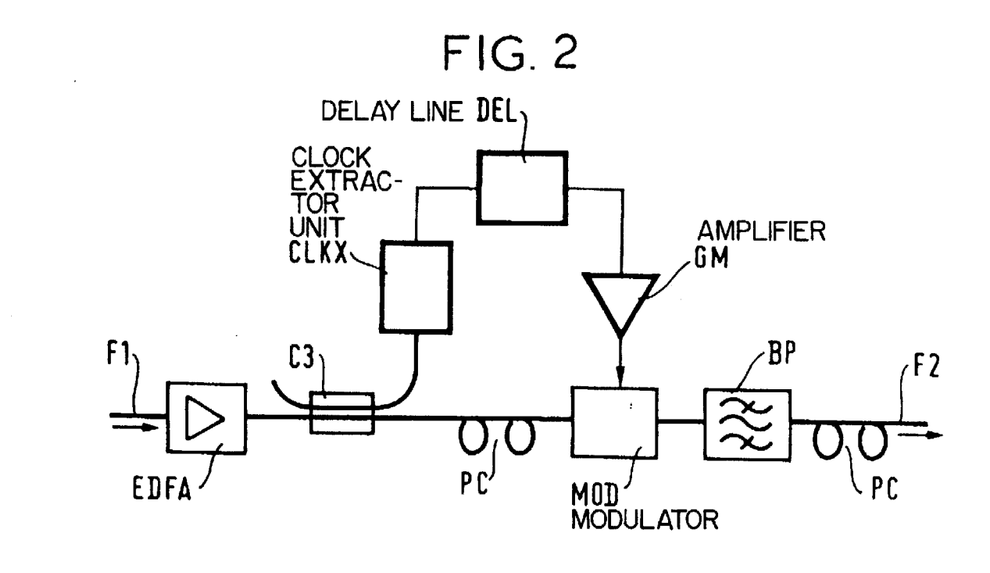
FIG. 2 is a diagram of apparatus known in the prior art for synchronous modulation of solitons and suitable for use in apparatus of the invention.

Document D2 describes the use of an LiNO$_3$ optical modulator for synchronously modulating solitons, as shown diagrammatically in FIG. 2. The problem with that solution is that the data rate of the signals to be regenerated cannot exceed 20 Gbit/s to 30 Gbit/s (10 Gbit/s in document D2). The LiNO$_3$ modulator is controlled by an electronic control signal generated in a clock circuit from the in-line soliton signal. The clock recovery means comprise: an optical coupler C3 for extracting of the optical signal propagating between the input F1 and the output F2; a clock extractor circuit CLKX; a delay-providing delay line DEL; and an amplifier GM for providing the control power required for operation of the LiNO$_3$ modulator MOD. As accessories, FIG. 2 shows an input optical amplifier EDFA to mitigate the insertion losses of the regenerator circuit; birefringent polarization control devices PC; and a bandpass filter BP for tightening the spectrum distribution of soliton energy. As in FIG. 1, the known system includes a narrow-band bandpass filter having a spectrum width that is slightly narrower than that of the solitons. In the soliton regenerator and in the system of the invention, the guiding filter is a channel filter.

Some of these accessories can be found in various preferred embodiments of the invention as described below.

To make it possible to modulate a plurality of WDM multiplexed soliton signals simultaneously and synchronously, i.e. to perform simultaneous and synchronous modulation of signals having different wavelengths, different group propagation velocities, and thus different travel times, it is necessary to find means for synchronizing the signals. According to the method of the invention, this can be achieved by selecting the optical path length travelled by the signals as a function of their wavelengths, so that the signals are at least approximately synchronized at the place where the modulator is located.

Although chromatic dispersion destroys synchronization of the various channels as they propagate over the fibers, all of the channels contain signals that are periodic, having bit rates that are identical on transmission. This gives rise to "collisions" between solitons in adjacent channels along the transmission line (see theoretical discussion in D3=Mollenauer et al., 1991). As a result, and taking account of the relative slip between the various channels, all of the channels are mutually resynchronized at certain points that are spaced apart along the line. It suffices to determine this spacing and to place the regenerators at one of such synchronization points to perform synchronous modulation using a single modulator and without demultiplexing. Two cases are considered: firstly when the dispersion gradient (D'$_0$=(dD/dλ)λ$_0$) is not zero, and secondly when it is zero.

For example, for two channels transmitted at λ$_1$ and λ$_2$ with λ$_0$ equals the zero dispersion wavelength, and Δλ=λ$_2$−λ$_1$, the difference in arrival time at the modulator is a result of the group time difference $\delta\tau_g = \tau_g(\lambda_n) - \tau_g(\lambda_1)$:

$$\delta\tau_g = \frac{1}{2}\left(\frac{\delta\Delta}{d\lambda}\right)_{\lambda_0} \{(\lambda_2-\lambda_0)^2 - (\lambda_1-\lambda_0)^2\} =$$

$$\frac{1}{2}\left(\frac{\delta\Delta}{d\lambda}\right)_{\lambda_0} \{\Delta\lambda^2 + 2\Delta\lambda(\lambda_1-\lambda_0)\}(\text{ps} \cdot \text{km}^{-1})$$

when D'$_0$≠0, and $\delta\tau_g = (\lambda_2-\lambda_1)D(\lambda_1)$ when D'(λ)=0

The method of the invention thus proposes using a single synchronous modulator for all of the WDM channels by carefully selecting the distance between the transmitter and the modulator, or between successive modulators, with reference to the channel spacing and to the chromatic dispersion of the fiber, so as to ensure that all of the channels are synchronized when they pass through the modulator. The distance Z$_R$ between modulators is selected so that the group time difference δτ$_g$ satisfies the following condition:

$$[kT-T/4] < \delta\tau_g Z_R < [kT+T/4]$$

where k is an integer and T is the bit time (for Z$_R$ in km, and δτ$_g$ in ps·km$^{-1}$). This constraint makes it possible to obtain approximate synchronization between the two WDM channels of wavelengths λ$_1$ and λ$_2$. Better synchronization can be obtained by reducing the width of the time window until the desired degree of synchronization has been obtained.

Thus, better results are obtained when the maximum group time difference δτ$_g$ for a modulator located at a distance Z$_R$ is equal to an integer multiple k of the bit time T plus or minus some smaller fraction of the bit time:

$$[kT-T/N] < \delta\tau_g Z_R < [kT+T/N]$$

where N>4, and for Z$_R$ in km and δτ$_g$ in ps·km$^{-1}$.

Figure 3:
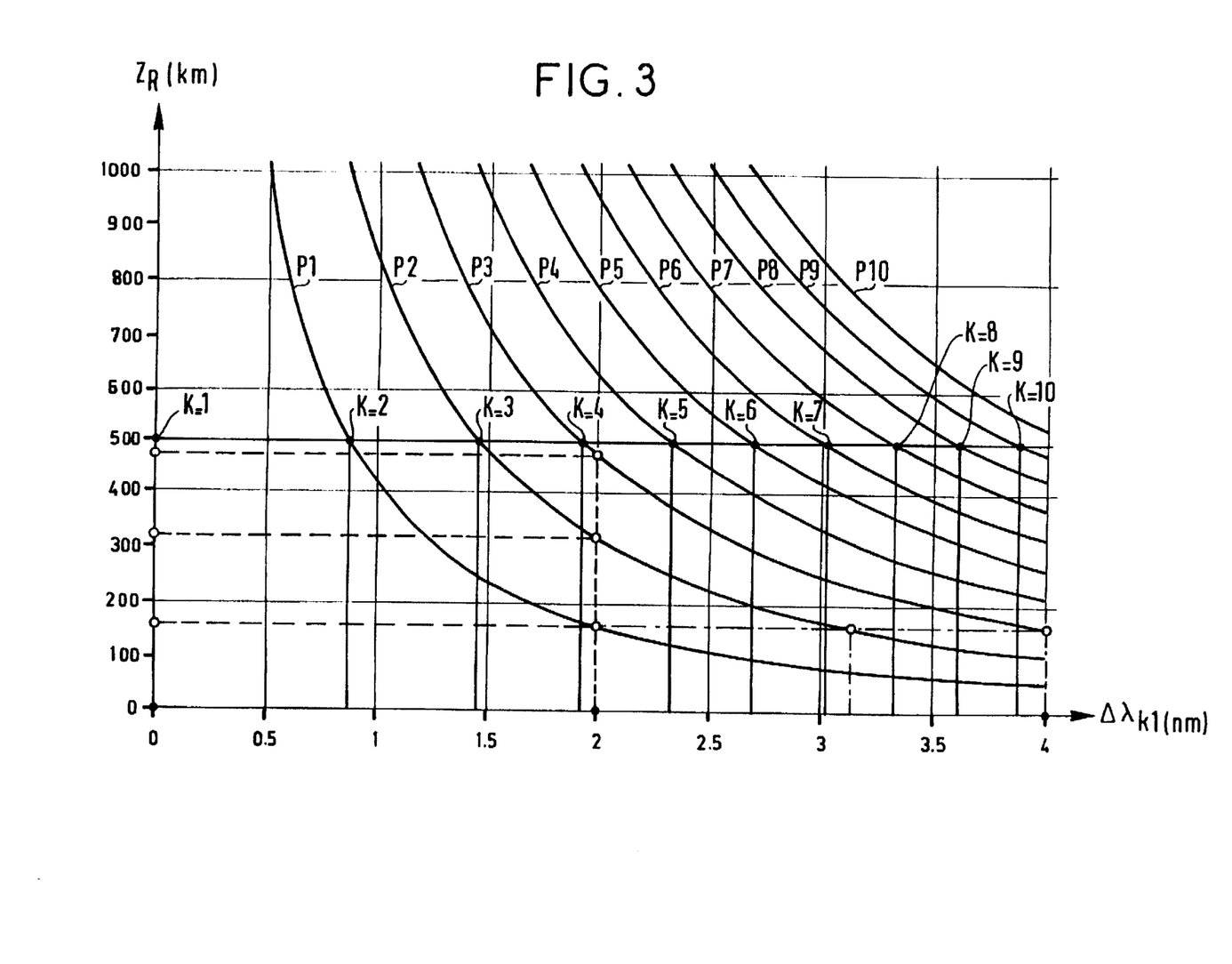
FIG. 3 is a diagrammatic chart relating distance between soliton regenerator apparatuses in a long distance link, to channel separation in a WDM soliton transmission system.

FIG. 3 is a diagrammatic chart showing distance Z$_R$ between soliton regenerator apparatuses on a long distance link, and the separation Δλk$_1$ between channels at wavelengths $\lambda_k$ and $\lambda_1$, where $\lambda_1$, is the shortest wavelength in the WDM band in a WDM soliton transmission system (when $D'_0 \neq 0$). The curves on the chart are identified on the right-hand side of the figure by a parameter p, which represents the number of bit periods separating two signals at a distance $Z_R$ (in km) for a wavelength difference $\Delta\lambda_{k1}$ in nm.

To give a few examples of how this chart should be read, dashed lines help to guide the eye of the reader. For example, for two channels separated by 2 nm, synchronization can be found at a distance $Z_R=160$ km approx., with slip of one bit time period between the two channels, or at a distance of $Z_R=320$ km approx. for slip of two bit time periods between the channels, or indeed a distance $Z_R=480$ km approx. for slip of three bit time periods between the channels.

To give another example of how this chart can be read, continuous lines serve to guide the eye of the reader. For example, at a regeneration distance of $Z_R=500$ km approx., a WDM system having channels spaced apart as indicated by the continuous lines will ensure that the signals are synchronous at the regenerator. In the example shown in the figure, wavelengths are given relative to the shortest wavelength $\lambda_1$, in terms of wavelength differences $\Delta\lambda_{k1}=\lambda_k-\lambda_1$ which are approximately as follows:

$\Delta\lambda_{21}=0.85$ nm; p=1;
$\Delta\lambda_{31}=1.45$ nm; p=2;
$\Delta\lambda_{41}=1.95$ nm; p=3;
$\Delta\lambda_{51}=2.35$ nm; p=4;
$\Delta\lambda_{61}=2.65$ nm; p=5;
$\Delta\lambda_{71}=3.05$ nm; p=6;

In the figure, it can be seen that for a fixed length $Z_R$ of fiber between regenerators, it is possible to synchronize a plurality of channels having wavelengths that are determined by said length $Z_R$. In contrast, when designing systems, it is often more convenient, particularly when implementing channel filters, to have regular spacing between the channels. Under such circumstances, it is possible to write $\Delta\lambda_{k1}(P)=(k-1)\Delta\lambda$, where $\Delta\lambda=\lambda_k-\lambda_{k-1}$ for integer k and k>1, and for p=k(k-1)/2, i.e. for the same spacing between each pair of adjacent channels. Using the relationships given above, it can be found that:

$$\lambda_1 - \lambda_0 = \frac{\Delta\lambda}{2} = \left(\frac{T_{bit}}{4Z_R D'_0}\right)^{1/2}$$

where $\lambda_0$ is the zero-dispersion wavelength.

Figure 4:
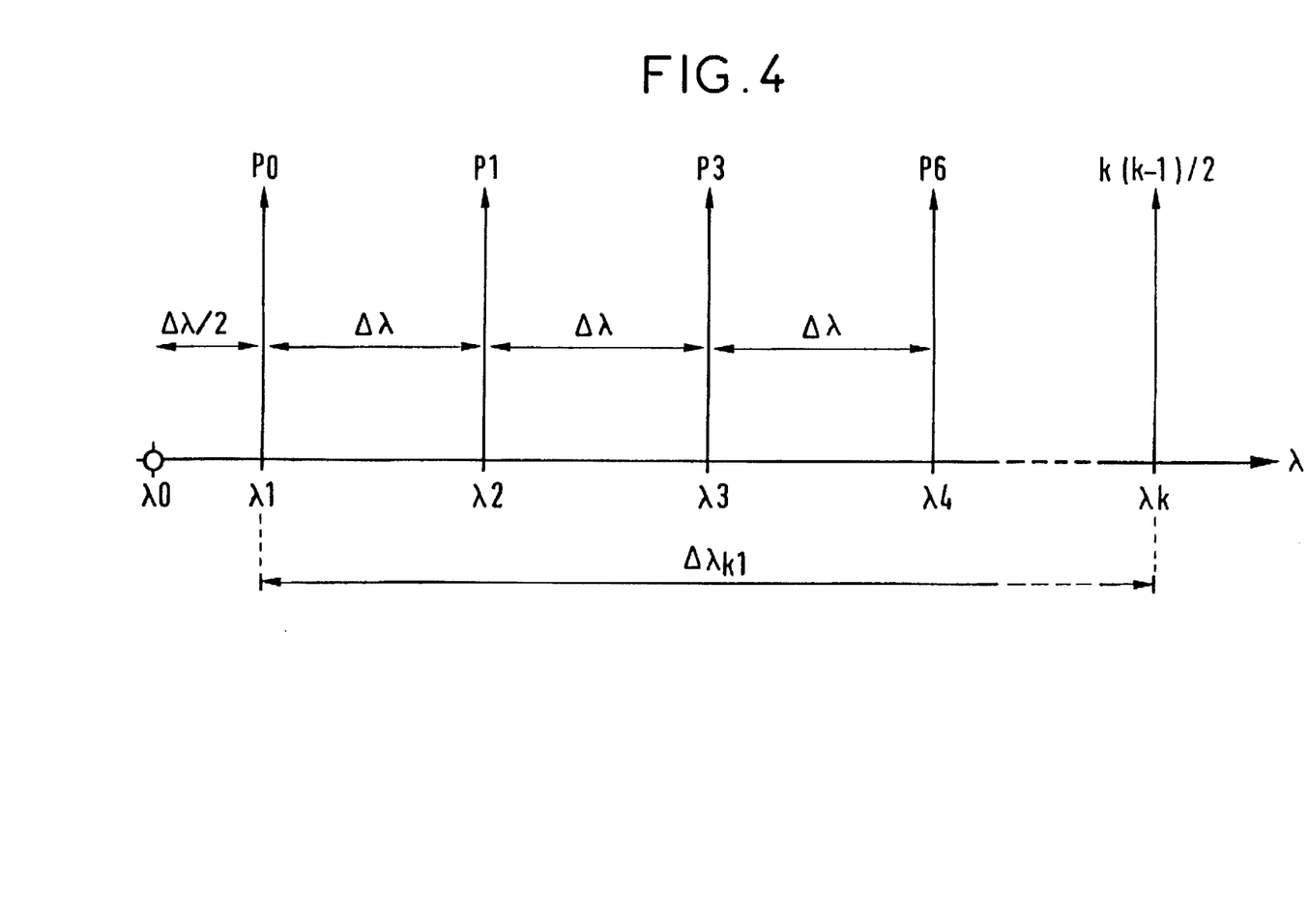
FIG. 4 is a diagram showing one example of preferred spacing of WDM channels in a telecommunications system of the invention.

Such regular channel spacing is shown in FIG. 4, with the value of the parameter p which corresponds to each value of k. It will be observed that the spacing of the first channel relative to the zero-dispersion wavelength is only half the spacing of the following channels relative to the adjacent channels; this stems from the above relationships (see the equation at the end of the previous paragraph).

A practical example of a synchronous WDM system having a capacity of N×20 Gbit/s corresponds to $T_{bit}=50$ ps, $D'_0=8\times10^{-2}$ ps/nm²/km, and $Z_R=500$ km, giving spacing between channels of about 1.1 nm.

The method of the invention is entirely compatible with managing dispersion in the manner described in the above-mentioned documents, or in any other system for managing dispersion. This can be done merely by replacing the fixed parameters in the equations given above with effective values calculated using methods outlined below.

We begin by considering the case of a system comprising a plurality q of fiber lengths $(t_1, t_2, \ldots, t_k, \ldots, t_q)$, each of length $L_k$ and having a dispersion gradient $D'_0(\lambda_{0k})$ which is zero at the respective wavelength $\lambda_{0k}$. Under such circumstances, the effective dispersion $D_{\text{eff}}(\lambda)$ can be calculated as can both the effective wavelength $\lambda_{0,\text{eff}}$ for zero dispersion, and the dispersion gradient $D'_{0,\text{eff}}$. This parameter suffices for implementing the above calculations to perform the invention:

$$D'_{0,\text{eff}} = \frac{\sum_{k=1}^{q} L_k D'(\lambda_{0k})}{\sum_{k=1}^{q} L_k}$$

with $L=\Sigma L_k$. When the number of lengths is great (q>>1), the sums can be replaced by integrals ($L_k$ by dz) which correspond to a continuous dispersion profile. In addition, it is possible to select ($L_k$, $D'(\lambda_{0k})$) such that the sum of the numerator is zero, giving $D'_{0,\text{eff}}=0$ (compensated gradient system).

If $D'_{0,\text{eff}} \neq 0$, channels $c_k$ and $c_1$ are synchronized at distance $Z_R$ under the same conditions as above if the dispersion gradient is replaced by the effective dispersion gradient:

$$\Delta\lambda = \left(\frac{T_{bit}}{Z_R D'_{0,\text{eff}}}\right)^{1/2}$$

It should also be observed that it is entirely possible to select a portion m only of the n wavelengths provided by the above formulas in order to form an m-channel WDM system. This option can be used, for example, to reduce the effect of jitter generated by soliton collisions along the link. It may also be advantageous to reduce spacing between regenerators.

Figure 5:
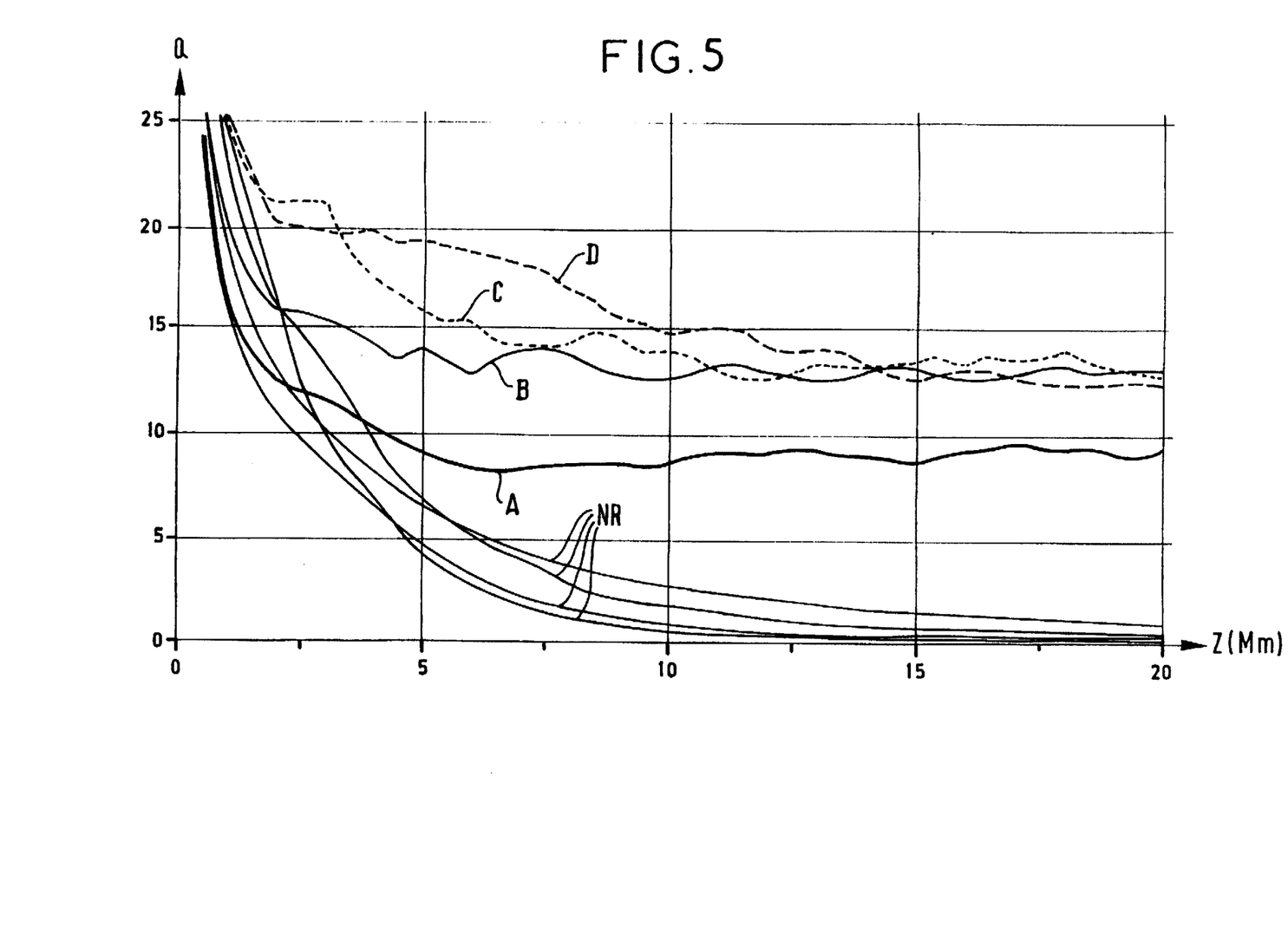
FIG. 5 shows the results of simulations concerning quality factor Q as a function of link length, and making the advantages provided by the invention clear.

FIG. 5 shows the results of simulations concerning quality factor as a function of distance, for a WDM system designed in accordance with the above-described rules. The parameters selected for performing the calculations were as follows: four channels each at 10 Gbit/s for a WDM link providing $4\times10^7$ b/s, with synchronous amplitude modulation of the solitons, and with filtering using a channel filter. The distances between amplifiers, filters, and modulators were set respectively at $Z_a=30$ km, $Z_f=4Z_a=120$ km, and $Z_{Rmin}=4Z_f=480$ km. The channel filter was of the Fabry Perot type, with $\Delta\lambda=1$ nm, with the band transmission curve form to be optimized. Other parameters were fixed as follows:

$D'_0=6.95\times10^{-2}$ ps/nm⁻²/km and $Z_R=720$ km$=3Z_{Rmin}/2$. Also, $\lambda_0=1.5528$ nm, $D''_0=0$, and $A_{\text{eff}}=50$ μm² was the effective area, with fiber losses $\alpha=0.20$ dB/km, and $\eta_{sp}/\eta_{in}=2$ (ratio of spontaneous emission divided by input coupling losses of the amplifiers), soliton pulse width $\Delta T =20$ ps, and modulation depth 10 dB.

The channels A, B, C, and D correspond to wavelengths described by the following (k,p) parameters: (3,3), (4,6), (6,15), and (7,21). In physical wavelengths, this gives $\lambda_A=1555.3$ nm ($\Delta\lambda_{31}=2.5$ nm), $\lambda_B=1556.3$ nm ($\Delta\lambda_{41}=3.5$ nm), $\lambda_C=1558.3$ nm ($\Delta\lambda_{31}=5.5$ nm), and $\lambda_D=1559.1$ nm ($\Delta\lambda_{71}=6.5$ nm), respectively. For the simulation, the solitons were coded using a pseudo-random sequence of $2^7-1$ bits without initial correlation. Propagation over a distance of 20,000 km was calculated using the non-linear Schroedinger equation using the method of increments in Fourier analysis.

The curves NR show the quality factors of the four channels without regeneration; the curves A, B, C, and D show the quality factors of the four channels with synchronous regeneration in application of the method of the invention. Significant improvement can be observed when regeneration is used, and it can be seen that otherwise the link cannot be considered as being satisfactory beyond 4

Mm or 5 Mm. In contrast, by using the method of the invention, the quality factor remains entirely acceptable even beyond 20,000 km (i.e. 20 Mm). We believe the relatively poor performance of the first channel A to be due to collisions between solitons which are significantly more numerous for this channel. The best performance was observed for channel D which suffered the smallest number of collisions.

The eye diagrams at 20,000 km for the four channels show that noise intensity is responsible for the lower performance of channel A compared with channel D. On arrival, not only does Gordon-Haus time jitter present collision effects between solitons and WDM interactions, but it is also converted into amplitude noise at the output of the regenerator.

The maximum error between channels A and B at a distance $Z_{Rein}$ can be found by calculation: $\delta\tau_{73}=1.39$ ps. This error is considered as insignificant and has no influence on the effectiveness of synchronous modulation.

When the dispersion gradient is zero ($D'(\lambda)=0$ in a spectrum region of interest) or even compensated ($D'_{0,eff}=0$), channel synchronization is given by the condition $$\Delta\lambda = \frac{T_{bit}}{Z_R D}$$

where D is the dispersion constant in the region of interest (with multiple lengths $D=D_{eff}$=constant) with $$D_{eff} = \frac{\Sigma \Delta L_k D(\lambda_k)}{\Sigma \Delta L_k}$$

Note that in this latter case ($D'=0$, $D'_{0,eff}=0$), the position of the comb of wavelengths in the spectrum region of interest does not matter.

The apparatus of the invention is described above with reference to only a few embodiments using particular parameters in a WDM system, and making use of a few prior art apparatuses for implementing a regenerated WDM system. This list of embodiments of the invention is not exhaustive and the person skilled in the art will know how to adapt the apparatus of the invention to particular needs.

We claim:

1. A method of in-line regeneration of optical signals propagating over an optical fiber between a transmitter and a receiver, said signals being in the form of a stream of bits represented by solitons and having a propagation wavelength and a bit rate, said signals including an optical signal to be regenerated, the method comprising:

amplifying said optical signal to be regenerated to compensate for possible losses;

taking off a portion of the optical signal to be regenerated via an optical coupler coupled to said fiber;

recovering the clock signal of said bit stream from said taken-off portion;

applying said clock signal via appropriate phase shifting to an optical modulator to provide synchronous modulation of said optical signal to be regenerated; and then subjecting the solitons of said optical signal to be regenerated to spectral filtering;

said solitons being characterized by a plurality m of propagation wavelengths in a spectrum band having ends $\lambda_1$ and $\lambda_n$ which are respectively the shortest and the longest wavelengths of said plurality m of propagation wavelengths;

said regeneration being performed at a distance $Z_R$ between said transmitter and said optical modulator, or between two successive modulators, said distance $Z_R$ being selected so that its product when multiplied by the arrival time difference $\delta\tau_g=\tau_g(\lambda_n)-\tau_g(\lambda_1)$ satisfies:

$$(kT-T/4) < \delta\tau_g Z_R < (kT+T/4)$$

where:

k is an integer, and

T is the bit time for $Z_R$.

2. A method of in-line regeneration according to claim 1, further comprising selecting said distance $Z_R$ so that its product when multiplied by the group time difference $\delta\tau_g=\tau_g(\lambda_n)-\tau_g(\lambda_1)$ also satisfies:

$$(kT-T/N) < \delta\tau_g Z_R < (kT+T/N)$$

where N>4.

3. A method of in-line regeneration according to claim 1, wherein said optical fiber comprises a plurality of fiber lengths, each length being characterized in part by a length and by a value for chromatic dispersion, said method further comprising managing the dispersion of said lengths of fiber.

4. A method of in-line regeneration of optical signals propagating over an optical fiber between a transmitter and a receiver, said signals being in the form of a stream of bits represented by solitons and having a propagation wavelength and a bit rate, said signals including an optical signal to be regenerated, the method comprising:

amplifying said optical signal to be regenerated to compensate for possible losses;

taking off a portion of the optical signal to be regenerated via an optical coupler coupled to said fiber;

recovering the clock signal of said bit stream from said taken-off portion;

applying said clock signal via appropriate phase shifting to an optical modulator to provide synchronous modulation of said optical signal to be regenerated; and then subjecting the solitons of said optical signal to be regenerated to spectral filtering;

said solitons being characterized by a plurality m of propagation wavelengths selected from n wavelengths $\lambda_1, \ldots, \lambda_n$, lying in a spectrum band having ends $\lambda_1$ and $\lambda_n$, which are respectively the shortest and the longest wavelengths of said plurality m of propagation wavelengths;

said clock signal being recovered from a wavelength $\lambda_k$ between $\lambda_1$ and $\lambda_n$, such that $\tau_g(\lambda_k)Z_R=kT$;

said regeneration being performed at a distance $Z_R$ between said transmitter and said optical modulator, or between two successive modulators, where $\lambda_j-\lambda_{j-1}=\Delta\lambda$, $\forall j > 0$, for integer j, and $$\lambda_1 - \lambda_0 = \frac{\Delta\lambda}{2} = \left(\frac{T_{bit}}{4Z_R D_0}\right)^{1/2}$$

where:

$\lambda_0$ is the zero dispersion wavelength when $D'_0 \neq 0$, and $\Delta\lambda = T_{bit}/Z_R D$ when $D'_0=0$ with D=constant.

5. An optical transmission system for transmitting optical signals in the form of bit streams represented by solitons characterized in particular by a propagation wavelength and a bit rate, said system comprising:

a transmitter;

a receiver;

an optical fiber interconnecting the transmitter and the receiver;

one or more optical regenerator apparatuses, each optical regenerator apparatus including a clock recovery circuit; and one or more optical modulators, each optical modulator being together with a spectral filter;

said transmitter transmitting the solitons at a plurality of wavelengths lying in a spectrum band having ends $\lambda_1$ and $\lambda_n$, respectively being the shortest and the longest wavelengths of said plurality of wavelengths;

said different wavelengths being associated with respective different group propagation times $\tau_g(\lambda_1)$, $\tau_g(\lambda_n)$, said group propagation times being characterized by a group propagation time difference $\delta\tau_g = \tau_g(\lambda_n) - \tau_g(\lambda_1)$;

one of said one or more optical regenerator apparatuses being disposed at a distance $Z_R$ between said transmitter and one of said one or more optical modulators, or between two successive ones of said one or more optical modulators, said distance $Z_R$ being selected such that its product when multiplied by the group propagation time difference $\delta\tau_g = \tau_g(\lambda_n) - \tau_g(\lambda_1)$ satisfies:

$$(kT - T/4) < \delta\tau_g Z_R < (kT + T/4)$$

where:

k is an integer, and

T is the bit time for $Z_R$.

6. An optical transmission system according to claim 5, wherein said distance $Z_R$ is such that its product, when multiplied by the group propagation time difference $\delta\tau_g = \tau_g(\lambda_n) - \tau_g(\lambda_1)$ satisfies:

$$(kT - T/N) < \delta\tau_g Z_R < (kT + T/N)$$

where N>4.

7. An optical transmission system according to claim 5, further comprising:

a plurality q of fiber lengths, each length being characterized in part by a length and by a value for chromatic dispersion, the dispersion of said fiber lengths being managed.

8. An optical transmission system according to claim 7, wherein:

q tends towards infinity, each of the plurality q of fiber lengths tends towards the infinitesimal, the chromatic dispersion varies continuously, and the effective dispersion is calculated by the integral.

9. An optical transmission system according to claim 8, wherein the effective dispersion gradient $D'_{0\mathit{eff}}$ is zero, and $\Delta\lambda = T_{bit}/Z_R D$.

10. An optical transmission system according to claim 9, wherein the dispersion gradient D' is effectively zero.

11. An optical transmission system for transmitting optical signals in the form of bit streams represented by solitons characterized in particular by a propagation wavelength and a bit rate, said system comprising:

a transmitter;

a receiver;

an optical fiber interconnecting the transmitter and the receiver;

one or more optical regenerator apparatuses, each optical regenerator apparatus including a clock recovery circuit; and one or more optical modulators, each optical modulator being together with a spectral filter;

said transmitter transmitting the solitons at a plurality of wavelengths lying in a spectrum band having ends $\lambda_1$ and $\lambda_n$, respectively being the shortest and the longest wavelengths of said plurality of wavelengths;

said different wavelengths being associated with respective different group propagation times $\tau_g(\lambda_1)$, $\tau_g(\lambda_n)$ said group propagation times being characterized by a group propagation time difference $\delta\tau_g = \tau_g(\lambda_n) - \tau_g(\lambda_1)$;

one of said one or more optical regenerator apparatuses being disposed at a distance $Z_R$ between said transmitter and one of said one or more optical modulators, or between two successive ones of said one or more optical modulators;

said optical transmission system using a plurality m of WDM channels selected from n channels having respective wavelengths $\lambda_1, \lambda_2, \ldots, \lambda_n$, where, for integer j:

$$\lambda_j - \lambda_{j-1} = \Delta\lambda,$$
$$\forall j > 0,$$

$$\lambda_1 - \lambda_0 = y \left( \frac{T_{bit}}{Z_R D_0} \right)^{1/2},$$

$\Delta\lambda = x(\lambda_1 - \lambda_0)$ where $\lambda_0$ is the zero dispersion wavelength, and $$x = \frac{2M}{2N - M}, \quad y = \frac{2N - M}{2\sqrt{M}}$$

being non-zero integers and $2N > M \geq 1$.

12. An optical transmission system according to claim 11, wherein:

N=M=1, x=2, y=½, and $$\lambda_1 - \lambda_0 = \frac{\Delta\lambda}{2} = \left( \frac{T_{bit}}{4 Z_R D_0} \right)^{1/2};$$

where $\lambda_0$ is the zero dispersion wavelength when $D'_0 \neq 0$ and $\Delta\lambda = T_{bit}/Z_R D$ when $D'=0$ with D=constant.

13. An apparatus for regenerating solitons, comprising:

a clock recovery circuit synchronized to the bit rate of a soliton signal on a transmission channel via an optical coupler;

means for matching a phase $\Phi$;

a modulator for modulating at least one of intensity and phase, said modulator being driven by the clock signal; and an optical channel guiding filter putting soliton pulses of a plurality of wavelengths into the same time position.

14. An optical transmission system comprising:

a transmitter, a receiver, an optical fiber between said transmitter and said receiver, an optical regenerator, and an optical modulator;

said optical regenerator having a clock recovery circuit;

said optical modulator having a spectral filter;

said optical fiber having a chromatic dispersion;

said transmitter transmitting a plurality of WDM multiplexed soliton signals with a channel spacing;

said plurality of WDM multiplexed soliton signals having different wavelengths, different group propagation velocities, and different travel times;

said optical modulator being disposed along said optical fiber at a distance from said transmitter; and said distance being based on:
said channel spacing of said plurality of WDM multiplexed soliton signals,
said chromatic dispersion of said optical fiber, and
a group time difference of said plurality of WDM multiplexed soliton signals.

15. The optical transmission system as set forth in claim 14, wherein said distance and said group time difference satisfy:

$$(kT-T/N) < \delta\tau_g Z_R < (kT+T/N)$$

where:
k is an integer,
$\delta\tau_g$ is said group time difference,
$Z_R$ is said distance,
T is the bit time for $Z_R$, and
$N \geq 4$.

16. An optical transmission system comprising:
a transmitter, a receiver, an optical fiber between said transmitter and said receiver, an optical regenerator, and first and second optical modulators;
said optical regenerator having a clock recovery circuit;
said first and second optical modulators each having a respective spectral filter;
said optical fiber having a chromatic dispersion;
said transmitter transmitting a plurality of WDM multiplexed soliton signals with a channel spacing;
said plurality of WDM multiplexed soliton signals having different wavelengths, different group propagation velocities, and different travel times;
said first optical modulator being disposed along said optical fiber at a distance from said second optical modulator; and said distance being based on:
said channel spacing of said plurality of WDM multiplexed soliton signals,
said chromatic dispersion of said optical fiber, and
a group time difference of said plurality of WDM multiplexed soliton signals.

17. The optical transmission system as set forth in claim 16, wherein said distance and said group time difference satisfy:

$$(kT-T/N) < \delta\tau_g Z_R < (kT+T/N)$$

where:
k is an integer,
$\delta\tau_g$ is said group time difference,
$Z_R$ is said distance,
T is the bit time for $Z_R$, and
$N \geq 4$.

* * * * *